United States Patent
Singh

(10) Patent No.: US 12,148,271 B1
(45) Date of Patent: Nov. 19, 2024

(54) SYSTEM AND METHOD FOR DETECTING ANOMALOUS DISPENSING DEVICES

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/461,917

(22) Filed: Sep. 6, 2023

(51) Int. Cl.
  *G07F 19/00* (2006.01)
(52) U.S. Cl.
  CPC .................... *G07F 19/209* (2013.01)
(58) Field of Classification Search
  CPC ....... G07F 19/207; G07F 19/20; G07F 19/201
  USPC ......................................... 235/379
  See application file for complete search history.

(56) References Cited

U.S. PATENT DOCUMENTS

| | | | |
|---|---|---|---|
| 7,597,250 B2 | 10/2009 | Finn | |
| 8,185,088 B2 | 5/2012 | Klein et al. | |
| 8,186,598 B2 | 5/2012 | Faenza, Jr. | |
| 8,240,574 B2 | 8/2012 | Lasch et al. | |
| 8,271,397 B2 | 9/2012 | Weiss | |
| 8,723,941 B1 | 5/2014 | Shirbabadi et al. | |
| 8,944,317 B2 | 2/2015 | Lewis et al. | |
| 8,988,186 B1 * | 3/2015 | Dent | G07F 19/20 705/16 |
| 9,065,893 B2 | 6/2015 | Glaser | |
| 9,203,548 B2 | 12/2015 | Ray et al. | |
| 9,367,980 B2 | 6/2016 | Graef et al. | |
| 9,519,851 B2 | 12/2016 | Morrill Web et al. | |
| 9,727,661 B2 | 8/2017 | Kim | |
| 9,767,422 B2 | 9/2017 | Ray et al. | |
| 9,775,037 B2 | 9/2017 | Huber et al. | |
| 9,880,256 B2 | 1/2018 | Baxley et al. | |
| 10,122,736 B2 | 11/2018 | Baxley et al. | |
| 10,554,648 B1 | 2/2020 | Murakami et al. | |
| 10,769,633 B2 | 9/2020 | Dua | |
| 11,556,637 B2 | 1/2023 | Singh | |
| 11,657,681 B1 * | 5/2023 | Rodriguez Bravo | G07F 19/207 235/379 |
| 2019/0033845 A1 | 1/2019 | Cella et al. | |
| 2020/0349538 A1 | 11/2020 | Glaser | |
| 2021/0327223 A1 * | 10/2021 | Kumar | G07F 19/211 |
| 2022/0138755 A1 | 5/2022 | Aument | |

(Continued)

*Primary Examiner* — Ahshik Kim

(57) ABSTRACT

An apparatus for detecting anomalous dispensing machine obtains a set of test signals that includes electromagnetic signals propagated from internal component of a dispensing machine. The apparatus extracts a set of test features from the test signals. The apparatus obtains a set of baseline signals associated with the dispensing machine, where the baseline signals includes expected electromagnetic signals associated with the internal components of the dispensing machine. The apparatus extracts baseline features from the baseline signals. The apparatus compares each of the test features with the counterpart baseline feature. The apparatus determines whether the deviation between the test features and baseline features is more than a threshold percentage. If it is determined that the deviation between the test features and baseline features is more than the threshold percentage, the apparatus determines that an unverified device is installed at the dispensing machine and disables data communications with the dispensing machine.

20 Claims, 3 Drawing Sheets

(56) References Cited

U.S. PATENT DOCUMENTS

| 2022/0139175 | A1* | 5/2022 | Slensker | G07F 19/209 |
| | | | | 726/34 |
| 2024/0038029 | A1* | 2/2024 | Whytock | G07F 19/207 |

* cited by examiner

SYSTEM AND METHOD FOR DETECTING ANOMALOUS DISPENSING DEVICES

TECHNICAL FIELD

The present disclosure relates generally to information security, and more specifically to a system and method for detecting anomalous dispensing devices.

BACKGROUND

People use dispensing devices, such as automated teller machines (ATMs) or kiosks to receive items or services. The internal components of dispensing devices propagate unique electrical and electromagnetic signals. If a new or otherwise unverified component is added to a dispensing device, it causes unexpected fluctuations in the electrical and electromagnetic signals propagated from the internal components of the dispensing device.

SUMMARY

The system described in the present disclosure is particularly integrated into a practical application of detecting anomalous dispensing devices, disabling interactions with the anomalous dispensing devices, and alerting other users of the location of the anomalous dispensing devices. Therefore, the disclosed system improves the security of information associated with a user wanting to use a dispensing device and reduces the instances of fraudulent activities at dispensing devices.

In general, the disclosed system detects if there an unverified or malicious device installed at a dispensing device, and if it is determined that an unverified or malicious device is present at the dispensing device, prevents interaction between a card device and the anomalous dispensing device, communicates an alert signal to a server, where the alert signal indicates that the dispensing device is anomalous, communicates the alert signal to one or more card devices that are within a threshold vicinity of the anomalous dispensing device, and presents a visual indication on the card device that the dispensing device is anomalous and not safe to use.

In some cases, a bad actor may install a malicious device inside the dispensing device in an attempt to gain unauthorized access to the information associated with the user's card and/or take control of the dispensing device, among others. For example, the malicious device may include circuitries configured to read or scan the card information, such as name, profile number, pin number, and the like. The malicious device may be installed adjacent to a slot entrance of the dispensing device where cards may be inserted and use near-field communications (NFC) to access the information associated with the card. If such fraudulent activities are not detected, the bad actor may use the card information to generate a counterfeit card and use it to access a profile of the user. Current technology is not configured to prevent such fraudulent activities.

The present disclosure provides a technical solution to this and other technical problems currently arising in the realm of information security. The disclosed system is configured to implement a card device that is configured to detect signals that are being propagated from the internal components of the dispensing device. In response, the card device may extract a set of test features from the test signals. The card device obtains baseline signals associated with the dispensing device and extracts a set of baseline features from the baseline signals. The card device may then compare the baseline features with the test features. If a difference between the baseline features and test features is more than a threshold percentage, the card device may determine that the dispensing device is anomalous and that an unverified and malicious device is installed at the dispensing device. In response, the card device may perform one or more countermeasure actions. For example, the card device may disable the data communications from the card device to the dispensing device. In other words, the card device may prevent interactions between the card device and the dispensing device. In another example, the card device may transmit an alert signal to the server. Therefore, in response to receiving the alert signal, the server may transmit a deactivation signal to the dispensing device. The server may also transmit the alert signal to other card devices that are within the threshold vicinity of the dispensing device. In another example, the card device may cause its light-emitting diode (LED) indicator to emit a red light. This operation informs the user that the dispensing device is not safe to use. In another example, the card device may transmit the alert signal to one or more card devices that are within the threshold vicinity of the dispensing device. Thus, in response to receiving the alert signal, the card devices may cause their respective LED indicators to emit a red light—indicating that the dispensing device is not safe to use.

In this manner, the disclosed system provides several practical applications for detecting anomalous dispensing devices, disabling interactions with the anomalous dispensing devices, and alerting other users of the location of the anomalous dispensing devices. Therefore, the disclosed system improves the security of information associated with a user wanting to use a dispensing device, and reduces the instances of fraudulent activities at dispensing devices, among others. Examples of dispensing devices include, but are not limited to, kiosks and automated teller machines (ATMs).

In some embodiments, an apparatus for detecting anomalous dispending devices comprises a memory operably coupled to a processor. The memory is configured to store a set of baseline signals associated with an ATM, wherein the set of baseline signals comprises electromagnetic signals propagated from the internal components of the ATM when the ATM is initiated to operate. The processor is configured to obtain a set of test signals that comprise electromagnetic signals propagated from the internal components of the ATM. The processor is further configured to extract a set of test features from the set of test signals, wherein the set of test features indicates a test profile of the ATM. The processor is further configured to extract a set of baseline features from the set of baseline signals, wherein the set of baseline features comprises expected electromagnetic radiation patterns associated with the internal components of the ATM. The processor is further configured to compare each of the set of test features with a counterpart baseline feature from among the set of baseline features. The processor is further configured to determine a deviation between the set of test features and the set of baseline features. The processor is further configured to determine that the deviation between the set of test features and the set of baseline features is more than a threshold percentage. In response to determining that the deviation between the set of test features and the set of baseline features is more than the threshold percentage, the processor is further configured to determine that an unverified device is installed at the ATM causing the deviation between the set of test features and the set of baseline features and disable data communications between the apparatus and the ATM.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
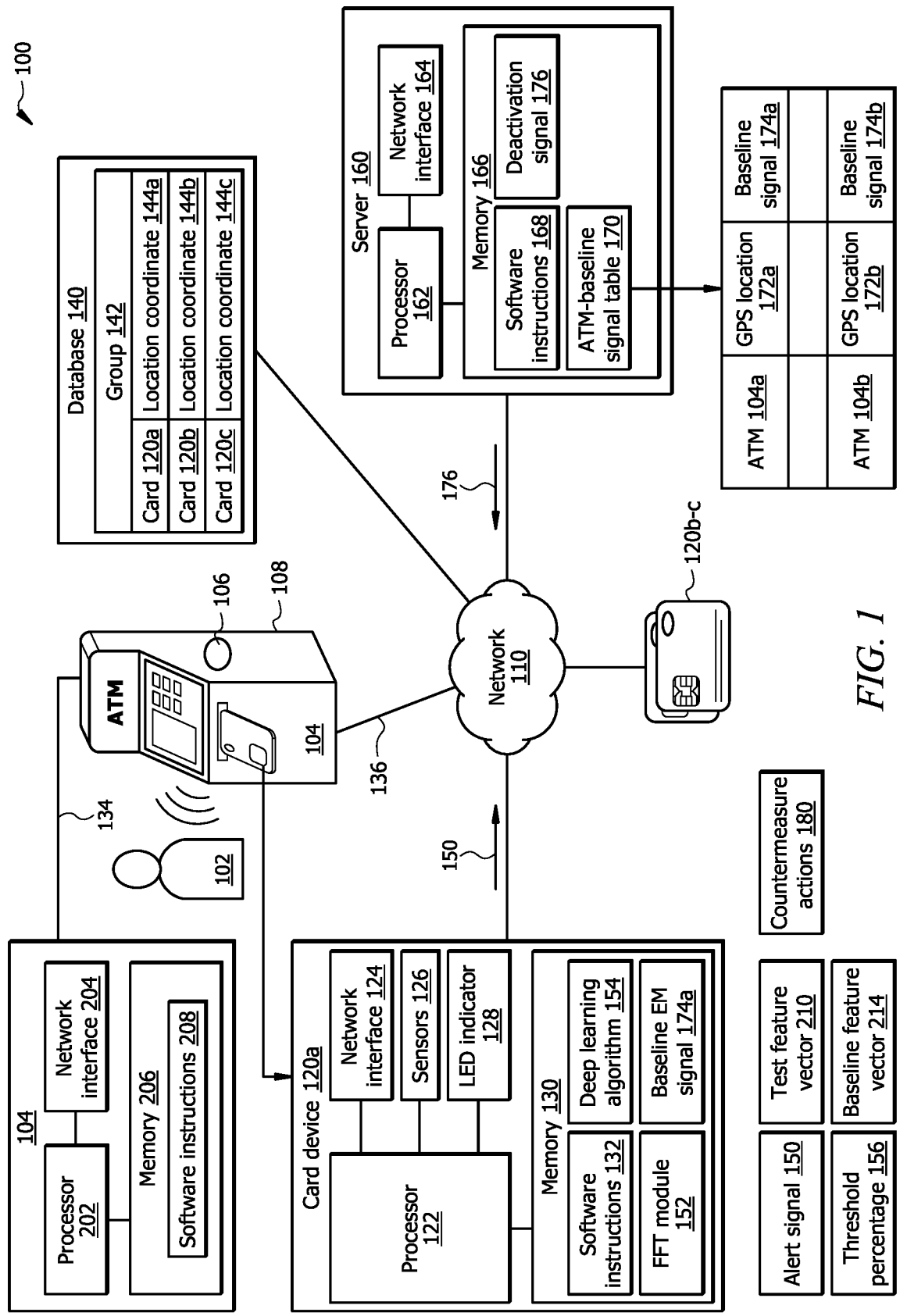
FIG. 1 illustrates an embodiment of a system configured to detect anomalous dispensing devices.
Figure 2:
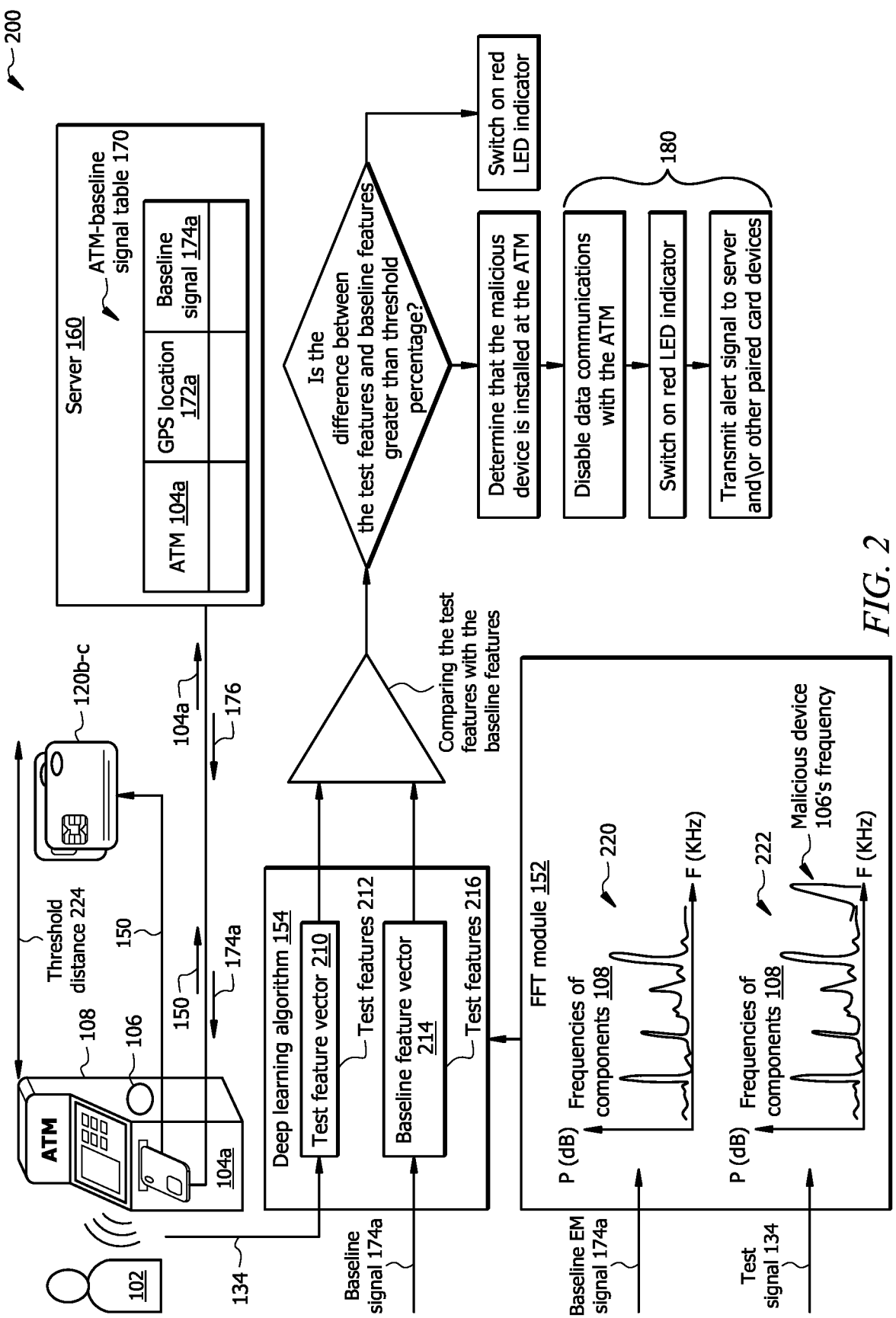
FIG. 2 illustrates an example operational flow of the system of FIG. 1.
Figure 3:
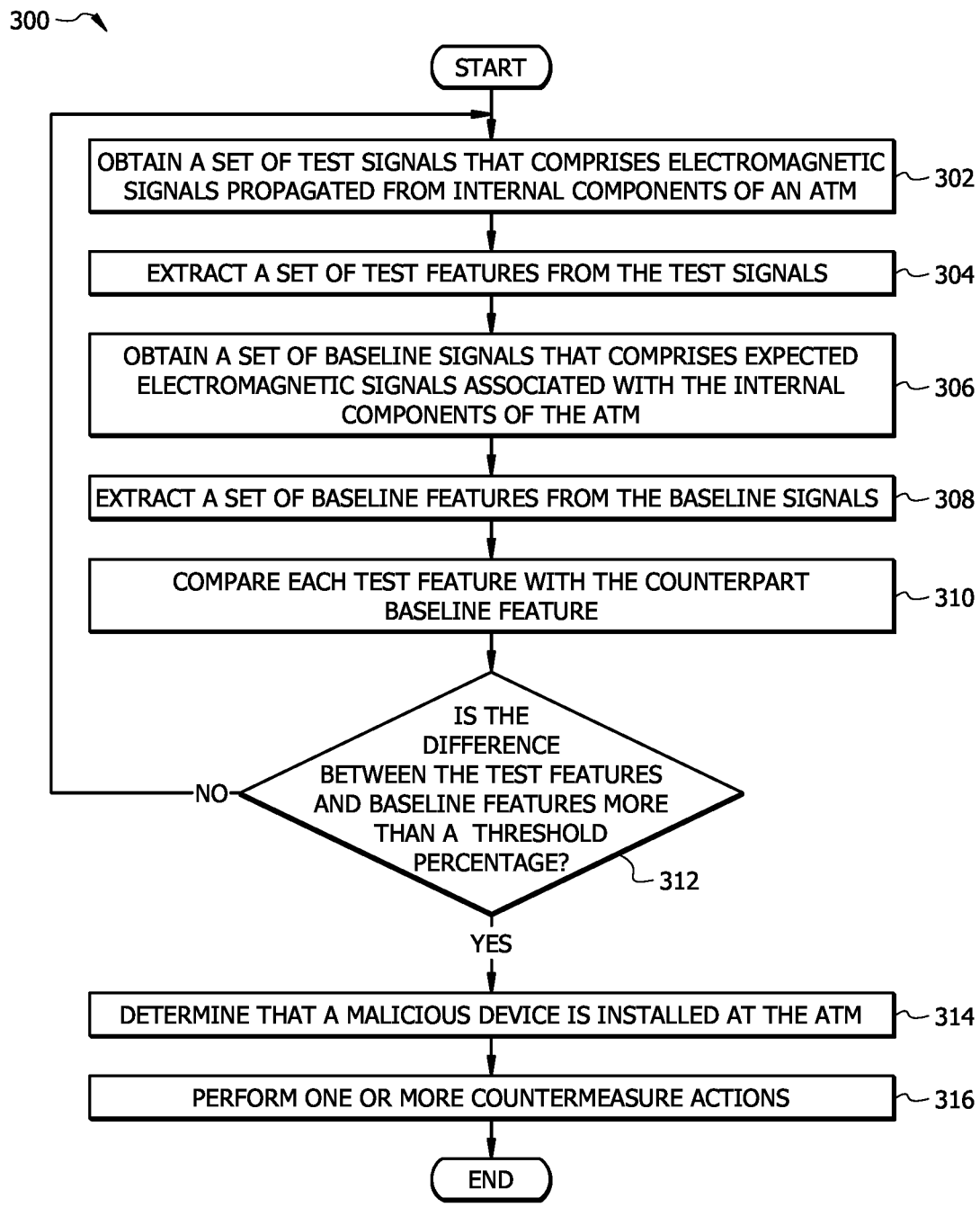
FIG. 3 illustrates an example flowchart of a method for detecting anomalous dispensing devices.

As described above, previous technologies fail to provide efficient and reliable solutions to detect anomalous dispensing devices. Embodiments of the present disclosure and its advantages may be understood by referring to FIGS. 1 through 3. FIGS. 1 through 3 are used to describe systems and methods to detect anomalous dispensing devices, according to some embodiments.

System overview FIG. 1 illustrates an embodiment of a system 100 that is generally configured to detect anomalous dispensing devices. Examples of the dispensing devices include, but are not limited to, kiosks and automated teller machines (ATMs), collectively referred to herein as ATM 104. In some embodiments, the system 100 comprises a card device 120 (e.g., card device 120a) communicatively coupled with one or more card devices 120b-c, an ATM 104, a database 140, and a server 160 via a network 110. Network 110 enables communications between components of the system 100. The card device 120 comprises a processor 122 in signal communication with a memory 130. Memory 130 stores software instructions 132 that when executed by the processor 122 cause the processor 122 to perform one or more operations of the card device 120. The server 160 comprises a processor 162 in signal communication with a memory 166. Memory 166 stores software instructions 168 that when executed by the processor 162 cause the processor 162 to perform one or more operations of the server 160. The ATM 104 comprises a processor 202 in signal communication with a memory 206. Memory 206 stores software instructions 208 that when executed by the processor 202 cause the processor 202 to perform one or more operations of the ATM 104. The database 140 stores information that can be used by other components of the system 100, including the card devices 120a-c and server 160. In other embodiments, system 100 may not have all of the components listed and/or may have other elements instead of, or in addition to, those listed above.

In general, the system 100 detects if there is an unverified device or malicious device installed at an ATM 104, and if it is determined that an unverified device or malicious device is present at the ATM 104, prevents interactions with the anomalous ATM 104, communicates an alert signal 150 to the server 160, where the alert signal 150 indicates that the ATM 104 is anomalous, communicates the alert signal 150 to one or more card devices 120b-c that are within a threshold vicinity of the anomalous ATM 104, and presents a visual indication on the card device 120 that the ATM 104 is anomalous.

In some cases, a bad actor may install a malicious device 106 inside the ATM 104 in an attempt to gain unauthorized access to the information associated with the user's card and/or take control of the ATM 104, among others. For example, the malicious device 106 may include circuitries configured to read or scan the card information, such as name, profile number, pin number, and the like. The malicious device 106 may be installed adjacent to a slot entrance of the ATM 104 where cards may be inserted into and use near-field communications (NFC) to access the information associated with the card. If such fraudulent activities are not detected, the bad actor may use the card information to generate a counterfeit card and use it to access a profile of the user 102. Current technology is not configured to prevent such fraudulent activities.

The present disclosure provides a technical solution to this and other technical problems currently arising in the realm of information security. The disclosed system 100 is configured to implement a card device 120 that is configured to detect signals 134 that are being propagated from the internal components of the ATM 104. In response, the card device 120 may extract a set of test features 212 from the signals 134. The test features 212 may indicate the test profile of the ATM 104. The card device 120 obtains baseline signals 174 associated with the ATM 104 and extracts a set of baseline features 216 from the baseline signals 174. The card device 120 may then compare the baseline features 216 with the test features 212. If a deviation or difference between the baseline features 216 and test features 212 is more than a threshold percentage 156, the card device 120 may determine that the ATM 104 is anomalous and that an unverified and malicious device 106 is installed at the ATM 104. In response, the card device 120 may perform one or more countermeasure actions 180. For example, the card device 120 may disable the data communications from the card device 120 to the ATM 104. In other words, the card device 120 may prevent interactions with the ATM 104. In another example, the card device 120 may transmit an alert signal 150 to the server 160. Therefore, in response to receiving the alert signal 150, the server 160 may transmit a deactivation signal 176 to the ATM 104. The server 160 may also transmit the alert signal 150 to other card devices 120 that are within a threshold vicinity of the ATM 104. In another example, the card device 120 may cause its light-emitting diode (LED) indicator 128 to emit a red light. This operation informs the user 102 that the ATM 104 is not safe to use. In another example, the card device 120 may transmit the alert signal 150 to one or more card devices 120b-c that are within the threshold vicinity of the ATM 104. Thus, in response to receiving the alert signal 150, the card devices 120b-c may cause their respective LED indicators 128 to emit a red light—indicating that the ATM 104 is not safe to use.

In this manner, the system 100 provides several practical applications for detecting anomalous ATMs 104, disabling interactions with the anomalous ATMs 104, and alerting other uses of the location of the anomalous ATMs 104. Therefore, the system 100 improves the security of information associated with a user 102 wanting to use an ATM 104, and reduces the instances of fraudulent activities at ATMs 104, among others.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Example Dispensing Machine

The dispensing machine may be an ATM 104 that is generally any kiosk or automated device configured to dispense items, provide physical items, and/or provide services when users interact with the ATM 104. For example, the ATM 104 may comprise a terminal device for dispensing items, tickets, scrip, airline tickets, displaying information on its display screen about a service or item, etc. In one embodiment, ATM 104 is an automated teller machine that allows users to withdraw cash, check balances, and make deposits interactively using, for example, a magnetically encoded card, a check, etc., among other services that the ATM 104 provides.

In the illustrated embodiment, an ATM 104 comprises a plurality of components 108. The components 108 may include electrical, mechanical, and electro-mechanical devices configured to operate various operations of the ATM 104. For example, components 108 may include circuit boards, wire cables, memory components, microchips, cash dispensers, cassettes (for storing bill notes), user interfaces (e.g., display screen, keypads, etc.), processor 202, network interface 204, memory 206, among any other component that an ATM 104 may include. Each component 108 is associated with a component property. The component property associated with a particular component 108 indicates a serial number that uniquely identifies the particular component 108. Each component 108 is fabricated by a particular vendor or manufacturer. Each vendor fabricates its components 108 in a particular manner. Different ways of fabricating components 108 result in different electrical signal ranges and electromagnetic radiation patterns. As such, each component 108 is associated with a unique electrical signature, including EM radiation signal and I/O voltage signal ranges 136. The card device 120 uses this information to determine whether a component 108 is verified based on its unique electrical signal signature, unique serial number, unique EM radiation pattern, unique component property, and the like. The card device 120 further uses this information to detect any unexpected fluctuations in the EM signal radiations and I/O voltage signal ranges 136. In case the malicious device 106 is installed in the ATM 104, the EM signal radiation and/or I/O voltage signal ranges of the malicious device 106 may cause fluctuations in the EM signal radiations and I/O voltage signal ranges associated with the components 108 of the ATM 104. The card device 120 may use this information to detect the malicious device 106. These processes are described in detail further below.

In some embodiments, the ATM 104 may include a processor 202 that is configured to transmit the baseline signals 174 and test signals 134. In certain embodiments, the internal components 108 may be configured to propagate the baseline signals 174 and test signals 134, including EM signals, I/O voltage signals, electrical signals, serial numbers, and component properties associated with the internal components 108. The processor 202 may include any processing circuitry configured to transmit the baseline signals 174 and test signals 134. The processor 202 may be in signal communication with other the internal components 108 of the ATM 104. The processor 202 is in signal communication with a memory 206 and a network interface 204.

Processor 202 comprises one or more processors operably coupled to the memory 206. The processor 202 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit, or of any other suitable architecture. The processor 202 may include an arithmetic logic unit (ALU) for performing arithmetic and logic operations, processor 202 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 208) to implement the operations of the processor 202. In this way, processor 202 may be a special-purpose computer designed to implement the functions disclosed herein. In an embodiment, the processor 202 is implemented using logic units, FPGAs, ASICs, DSPs, or any other suitable hardware. The processor 202 is configured to operate as described in FIGS. 1-3. For example, the processor 202 may be configured to perform one or more steps of method 300 as described in FIG. 3.

Network interface 204 is configured to enable wired and/or wireless communications (e.g., via network 110). The network interface 204 is configured to communicate data between the ATM 104 and other devices, ATMs 104, card devices 120a-c, server 160, databases (e.g., database 140), systems, and domains. For example, the network interface 204 may comprise an embedded subscriber identity module (eSIM) interface, NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 202 is configured to send and receive data using the network interface 204. The network interface 204 may be configured to use any suitable type of communication protocol as would be appreciated by one of ordinary skill in the art.

Memory 206 may be volatile or non-volatile and may comprise a read-only memory (ROM), random-access memory (RAM), ternary content-addressable memory (TCAM), dynamic random-access memory (DRAM), and static random-access memory (SRAM). Memory 206 may be implemented using one or more disks, tape drives, solid-state drives, and/or the like. Memory 206 is operable to store the software instructions 208, and/or any other data or instructions. The software instructions 208 may comprise any suitable set of instructions, logic, rules, or code operable to execute the operations of the processor 202.

Example Card Device

Each of the card devices 120a-c may be an instance of a card device 120. A card device 120 is a portable card device that is generally configured to process data and interact with users. In some embodiments, the card device 120 may be a thin apparatus that at least partially can be inserted into a slot of the ATM 104, where the internal components of the ATM 104 may read and access information displayed on the card device 120 and/or stored in the memory 130 of the card device 120. In some embodiments, the card device 120 may be configured to communicate data with the ATM 104 with wireless communication (e.g., via NFC) when the card device 120 is within a threshold communication range from the ATM 104. Examples of the card device 120 include a personal card, and the like. In some examples, the card device 120 may be associated with and used to access a digital profile of a user. In the illustrated embodiment, the card device 120 includes a processor 122 in signal communication with a network interface 124, sensors 126, an LED indicator 128, and a memory 130. In certain embodiments, the card device 120 may be configured as shown or in other configurations.

Processor 122 comprises one or more processors. The processor 122 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 122 may be a programmable logic device, a microcontroller, a microprocessor, or any suitable number and combination of the preceding. The one or more processors are configured to process data and may be implemented in hardware or software. For example, the processor 122 may be 8-bit, 16-bit, 32-bit, 64-bit, or of any other suitable architecture. The processor 122 may include an ALU for performing arithmetic and logic operations. The processor 122 may register the supply operands to the ALU and store the results of ALU operations. The processor 122 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 132) to perform the operations of the card device 120 described herein. In this way, processor 122 may be a special-purpose computer designed to implement the functions disclosed herein. In an embodiment, the processor 122 is implemented using logic units, FPGAs, ASICs, DSPs, or any other suitable hardware. The processor 122 is configured to operate as described in FIGS. 1-3. For example, the processor 122 may be configured to perform one or more operations of the operational flow 200 as described in FIG. 2, and one or more operations of method 300 as described in FIG. 3.

Network interface 124 is configured to enable wired and/or wireless communications. The network interface 124 may be configured to communicate data between the card device 120 and other devices, systems, or domains. For example, the network interface 124 may comprise an eSIM interface, NFC interface, a Bluetooth interface, a Zigbee interface, a Z-wave interface, an RFID interface, a WIFI interface, a (LAN) interface, a WAN interface, a MAN interface, a PAN interface, a WPAN interface, a modem, a switch, and/or a router. The processor 122 may be configured to send and receive data using the network interface 124. The network interface 124 may be configured to use any suitable type of communication protocol.

Sensors 126 may include any type of sensor, including a global positioning system (GPS) sensor, electromagnetic signal sensor, voltage signal sensor, and power signal sensor, among others. Each sensor 126 may be implemented in a sensor circuitry comprising electrical components configured to perform specific functions, such as detecting a GPS location coordinate of the card device 120, electromagnetic signals, voltage signals, power signals, and the like. For example, the electromagnetic signal sensor may be configured to detect electromagnetic signals, the voltage signal sensor may be configured to detect I/O voltage signal ranges 136 and signals indicating the serial numbers, component properties of the internal components of the ATM 104, and the GPS sensor may be configured to detect the location coordinate of the card device 120. The EM signal sensor 126 is generally a sensor that is configured to detect EM radiation signals propagated from the electrical components 108 and/or malicious device 106 (if present). The EM signal sensor 126 may be configured to detect a broad range of frequencies, e.g., from 100 KHz to 5 MHz, or any frequency that a component 108 or device 106 may propagate. When a first electrical component 108 transmits a signal to a second electrical component 108, the first and the second components 108 propagate an EM wave signal in a three-dimensional space. The EM signal sensor 126 is used to capture such EM wave radiation signals. Similarly, the EM signal sensor 126 may capture EM wave radiation signals generated by signal transmission between internal components of the malicious device 106. The EM signal sensor 126 is further configured to capture other wireless signals, e.g., signals in WIFI bandwidth, Bluetooth bandwidth, etc.

LED indicator 128 may include a strip of LEDs or one LED device and is generally configured to indicate whether an ATM 104 is anomalous. For example, the LED indicator 128 may include a first mode in which the LED indicator 128 emits a red light indicating that the ATM 104 is anomalous. In the same or another example, the LED indicator 128 may include a second mode in which the LED indicator 128 emits a green light indicating that the ATM 104 is safe to use and not anomalous. The LED indicator 128 may receive an instruction signal from the processor 122 to transition between the first mode and second mode, among other modes. For example, if the processor 122 (e.g., via the EM signal sensor 126) detects that a deviation or difference between the test signals 134 and baseline signals 174 is more than a threshold percentage 156, the processor 122 may transmit a first signal to the LED indicator 128 that causes the LED indicator 128 to transition to the first mode and emit a red light. In another example, if the processor 122 (e.g., via the EM signal sensor 126) detects that a deviation or difference between the test signals 134 and baseline signals 174 is less than a threshold percentage 156, the processor 122 may transmit a second signal to the LED indicator 128 that causes the LED indicator 128 to transition to the second mode and emit a green light.

Memory 130 may be volatile or non-volatile and may comprise ROM, RAM, TCAM, DRAM, and SRAM. The memory 130 may include one or more of a local database, a cloud database, a NAS, etc. The memory 130 comprises one or more disks, tape drives, or solid-state drives, and may be used as an over-flow data storage device, to store programs when such programs are selected for execution, and to store instructions and data that are read during program execution. The memory 130 may store any of the information described in FIGS. 1-3 along with any other data, instructions, logic, rules, or code operable to implement the function(s) described herein when executed by processor 122. For example, the memory 130 may store software instructions 132, baseline signals 174a, FFT module 152, deep learning algorithm 154, test feature vector 210, baseline feature vector 214, threshold percentage 156, countermeasure actions 180, and/or any other data or instructions. The software instructions 132 may comprise any suitable set of instructions, logic, rules, or code operable to execute the processor 122 and perform the functions described herein, such as some or all of those described in FIGS. 1-3.

FFT module 152 is generally a software and/or hardware module. The FFT module 152 may be implemented by the processor 122 executing the software instructions 132, and is configured to demodulate the EM radiation signals included in the test signals 134 and EM radiation signals included in the baseline signals 174. The FFT module 152 may include an analog-to-digital converter module that is configured to convert analog EM radiation signals to digital EM radiation signals. For example, assume that the ATM 104 comprises ten components 108. While the ATM 104 is in operation, for example, when a user is operating the ATM 104 to perform an operation, components 108 begins to process the operation. For example, when the user is operating the ATM 104 to perform an operation, a first component 108 may display a menu on a display screen of the ATM 104, a second component 108 may process a request of the user, etc. These activities of the components 108 results in propagating EM radiation signals by the components 108 and generating I/O voltage signal ranges 136 between the components 108.

For example, assume that there are ten components 108 in ATM 104. Thus, the EM radiations is a modulated signal that includes ten frequency components (e.g., 120 KHs, 130 KHz, . . . , 200 KHz), each associated with a certain component 108. The EM sensor 126 captures these EM radiation signals, and feeds them to the FFT module 152. The FFT module 152 demodulates the EM radiation signals, and determines each frequency component associated with each component 108. For example, the FFT module 152 determines that a first frequency component (e.g., 120 KHz) is associated with a first component 108, a second frequency component (e.g., 130 KHz) is associated with a second component 108, and so on. The card device 120 uses this information to determine whether a new component 108 has been added to the ATM 104, detect an unverified device or malicious device 106 whose EM radiation pattern differs from an EM radiation signal indicated in the baseline EM signals associated with the ATM 104, etc. For example, if the card device 120 detects eleven frequency components in the EM radiation signals 134, the card device 120 determines that the new device 106 has been added to the ATM 104 which is unverified or unauthorized. In another example, if the card device 120 detects an unexpected fluctuation in the EM radiation patterns or signals included in the test signals 134, the card device 120 may determine that an unverified device and/or malicious device 106 has been replaced with an existing component 108. These processes are described in detail further below. In another example, if the card device 120 detects an unexpected serial number of a component in the test signal 134 that is not present among the verified serial numbers of components 108 in the baseline signals 174, the card device 120 may determine that an unverified device and/or malicious device 106 has been added to the ATM 104. In another example, if the card device 120 detects an unexpected component property (e.g., vendor, manufacturer, brand) in the test signal 134 that is not present among the verified component property information associated with the components 108 in the baseline signals 174, the card device 120 may determine that an unverified device and/or malicious device 106 has been added to the ATM 104.

Deep learning algorithm 154 may be implemented by the processor 122 executing the software instructions 132 and is generally configured to process the test signals 134 and baseline signals 174. In some embodiments, the deep learning algorithm 154 may include a support vector machine, neural network, random forest, k-means clustering, etc. For example, the deep learning algorithm 154 may be implemented by a plurality of neural network (NN) layers, convolutional NN (CNN) layers, Long-Short-Term-Memory (LSTM) layers, Bi-directional LSTM layers, recurrent NN (RNN) layers, and the like. In another example, the deep learning algorithm 154 may be implemented by analog signal processing, digital signal processing, signal quantization, signal frequency sampling, among others.

Thus, the card device 1120, using the deep learning algorithm 154, may be configured to process the test signals 134 to extract a set of test features 212 from the test signals 134, and process the baseline signals 174 to extract a set of baseline features 216 from the baseline signals 174. The test features 212 may be represented by a test feature vector 210 comprising numerical values. The baseline features 216 may be represented by a baseline feature vector 214 comprising numerical values. The card device 120 may compare the test features 212 with the baseline features 216 to determine whether there is a difference between the test signals 134 and the baseline signals 174. These operations are described in greater detail in FIGS. 2 and 3.

Example Database

Database 140 generally comprises any storage architecture. Examples of the database 140, include, but are not limited to, a network-attached storage cloud, a storage area network, a storage assembly directly (or indirectly) coupled to one or more components of the system 100. The database 140 stores one or more groups 142 of paired card devices 120. Each group 142 of paired card devices 120 may include two or more card devices 120 that are paired to each other. For example, users 102 of the card devices 120a-c may pair the card devices 120a-c so that they can communicate data, such as alert signal 150, to each other. Each card device 120 in a group 142 of paired card devices may provide its location coordinate to the database 140, in real time, periodically (e.g., every minute, every hour, etc.), or on demand. Therefore, the table of group 142 of paired card devices 120a-c may be populated with the location coordinates of the card devices 120a-c. In the example of FIG. 1, the card device 120a is associated with the location coordinate 144a, card device 120b is associated with the location coordinate 144b, and card device 120c is associated with the location coordinate 144c. The group 142 of card devices 120a-c may include fewer or more card devices. Other groups 142 of card devices 120 may be stored in the database 140.

Example Server

Server 160 is generally a device configured to process data and communicate with card devices 1020a-c, and databases (e.g., database 140), systems, domains, etc., via the network 110. In one example, server 160 may be a backend server associated with ATMs 104a-b, and is generally configured to oversee operations of the ATMs 104a-b. The server 160 is further configured to provide software and/or hardware resources (e.g., deactivation signal 176, baseline signals 174a-b, etc.) to the ATMs 104a-b and/or card devices 120a-c. In the illustrated embodiment, the server 160 includes the processor 162 in signal communication with the network interface 164 and the memory 166. In other embodiments, the server 160 may be configured as shown or in another configuration.

Processor 162 comprises one or more processors. The processor 162 is any electronic circuitry, including, but not limited to, state machines, one or more CPU chips, logic units, cores (e.g., a multi-core processor), FPGAs, ASICs, or DSPs. The processor 162 may be a programmable logic device, a microcontroller, a microprocessor, or any suitable combination of the preceding. The one or more processors are configured to process data and may be implemented in hardware or software. For example, the processor 162 may be 8-bit, 16-bit, 32-bit, 64-bit, or of any other suitable architecture. The processor 162 may include an ALU for performing arithmetic and logic operations, processor 162 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 168) to implement the operations of the processor 162. In this way, processor 162 may be a special-purpose computer designed to implement the functions disclosed herein. In an embodiment, the processor 162 is implemented using logic units, FPGAs, ASICs, DSPs, or any other suitable hardware. The processor 162 is configured to operate as described in FIGS. 1-3. For example, the processor 162 may be configured to perform one or more operations of the operational flow 200 described in FIG. 2 and one or more operations of the method 300 as described in FIG. 3.

Network interface 164 is configured to enable wired and/or wireless communications (e.g., via network 110). The network interface 164 is configured to communicate data between the server 160 and other devices, ATMs 104, card devices 120a-c, databases (e.g., database 140), systems, and domains. For example, the network interface 164 may comprise a WIFI interface, LAN interface, a WAN interface, a modem, a switch, or a router. The processor 162 is configured to send and receive data using the network interface 164. The network interface 164 may be configured to use any suitable type of communication protocol as would be appreciated by one of ordinary skill in the art.

Memory 166 may be volatile or non-volatile and may comprise a ROM, RAM), TCAM, DRAM, and SRAM. Memory 166 may be implemented using one or more disks, tape drives, solid-state drives, and/or the like. Memory 166 is operable to store the software instructions 168, ATM-baseline signals table 170, deactivation signal 176, and/or any other data or instructions. The software instructions 168 may comprise any suitable set of instructions, logic, rules, or code operable to execute the processor 162.

ATM-baseline EM signal table 170 includes a row/entry for each ATM 104a-b. Each row includes information about a respective ATM 104a-b, the location coordinate 172a-b of the ATM 104a-b, and baseline signals 174a-b associated with the respective ATM 104a-b. For example, the first row is associated with the ATM 104a and includes the location coordinate 172a of the ATM 104a, and baseline signals 174a associated with the ATM 104a, and another row is associated with the ATM 104b and includes the location coordinate 172b of the ATM 104b, and baseline signals 174b associated with the ATM 104b.

The location coordinates 172a-b of the respective ATM 104a-b may be provided by a technician who installs the respective ATM 104a-b, or by a location sensor installed in the respective ATM 104a-b. The baseline signal 174a-b of the respective ATM 104a-b may be determined when the respective ATM 104a-b is initially installed and/or initiated to operate when it is known that no malicious device 106 is present at the respective ATM 104a-b.

Operational Flow for Detecting Anomalous ATMs

FIG. 2 illustrates an example operational flow 200 of the system 100 (see FIG. 1) for detecting anomalous ATMs 104. The operational flow 200 may begin when the user 102 wants to interact with the ATM 104a. In an example scenario, the user 102 approaches the ATM 104a to interact with the ATM 104a, e.g., to obtain a ticket, obtain a document, provide a document, transfer data to another user via the ATM 104, or another operation that the ATM 104a is configured to perform.

Assume that the user 102 is carrying the card device 120a. In one embodiment, the card device 120a may include a fraud prevention mode, and when the user 102 wants to use the ATM 104a, the user 102 may activate the fraud prevention mode so that the card device 120a can perform the anomaly detection process described herein. For example, the fraud prevention mode can be activated when a button associated with the anomaly detection mode on the card device 120a is actuated or pressed. In some embodiments, the card device 120a may always be in the fraud prevention mode. As the user 102 approaches the ATM 104a, the card device 120a may obtain or detect the test signals 134 that are being propagated from the ATM 104a, for example, from the processor 202, internal components 108, and/or the malicious device 106 (if present).

Obtaining and Analyzing Baseline Signals Associated with the ATM

The card device 120a may determine the location coordinate of the ATM 104a, via the location sensor 126, for example, based on the location coordinate of the card device 120 by the location sensor 126. When the card device 120a is at the ATM 104a, e.g., being inserted into the slot of the ATM 104a or within a threshold vicinity (e.g., within one foot, two feet, etc.) from the ATM 104a, the location coordinate of the card device 120a may correspond to or substantially match the location coordinate the ATM 104a. Therefore, it may be assumed that the location coordinate of the card device 120a may correspond to the location coordinate of the ATM 104a when the card device 120a is at the ATM 104a. In this manner, the card device 120a may determine the location coordinate (or approximate location coordinate) of the ATM 104a.

To obtain the baseline signals 174a associated with the ATM 104a, the card device 120a may communicate the location coordinate of the ATM 104a to the server 160. The server 160 may search in the ATM-baseline signal table 170 and identify the row where the location coordinate 172a of the ATM 104a is indicated. For example, the server 160 may compare the received location coordinate of the ATM 104a with each location coordinate 172a-b indicated in the ATM-baseline signal table 170 and find a corresponding or matching location coordinate 172. In response to identifying the corresponding location coordinate 172a, the server 160 may fetch and communicate the baseline signals 174a associated with the ATM 104a to the card device 120a.

The baseline signals 174a may include electromagnetic signals propagated from the internal components 108 recorded when the ATM 104a is initiated to operate under monitored conditions when it is known that no other, unverified, or malicious devices 106 are present at the ATM 104a. In some embodiments, the baseline signals 174a may further include information indicating the serial numbers of each verified component 108 of the ATM 104a, information indicating component properties (e.g., the vendor, manufacture, brand, etc.) of each verified component 108 of the ATM 104a, the electrical signal signature and I/O voltage signal signature of each verified component 108 of the ATM 104a, and EM signal radiation patterns or signature of each verified component 108 of the ATM 104a, among other information.

When the ATM 104a is monitored under safe conditions where no unverified or malicious device 106 is present at the ATM 104a, the baseline signals 174a may be recorded by the EM sensor 126, voltage sensors, receiving antenna connected to a receiving processing circuitry with operating frequency range that encompasses beyond the frequency ranges of the components 108, and any other type of sensor circuitry. In this manner, the baseline signals 174a may be captured in the first instance of monitoring the ATM 104a and recorded in the table 170 and stored in the server 160. The baseline signals 174a may be fetched at a later time when it is desired to evaluate the ATM 104a and determine if any unverified or malicious device 106 is installed in the ATM 104a.

In response to receiving the baseline signals 174a, the card device 120a may feed the baseline signals 174a to the deep learning algorithm 154 and FFT module 152. The FFT module 152 may extract different frequency components of the internal components 108 of the ATM 104a as shown in the frequency domain plot 220. The frequency domain plot 220 has y-axis as frequency signal power in decibels (dB) and y-axis as frequency (KHz). The different frequency components of the components 108 of the ATM 104a are shown in the plot 220. The output of the FFT module 152, for example, the frequency components of the internal components 108 of the ATM 104a may be fed to the deep learning algorithm 154.

The card device 120a (e.g., via the deep learning algorithm 154) extracts a set of baseline features 216 from the baseline signals 174a and the input received from the FFT module 152. In this process, the deep learning algorithm 154 via a neural network may determine the baseline features 216. The baseline features 216 may be represented by the baseline feature vector 214 that comprises numerical values. The baseline features 216 may include the expected electromagnetic signal radiation patterns, signature, or profile of the ATM 104a and its internal components 108, expected I/O voltage signals, expected electrical signals, expected serial numbers, and expected component properties associated with the internal components 108 of the ATM 104a.

Obtaining and Analyzing Test Signals Associated with Internal Components of the ATM The card device 120a may detect the test signals 134 being radiated from the ATM 104a. In the example of FIG. 2, assume that the malicious device 106 is installed inside the ATM 104a. In this example, the test signals 134 may include information about test EM signals that are being propagated by the internal components 108 and malicious device 106, information indicating I/O voltage signals, electrical signals, serial numbers, component properties associated with the internal components 108. In this example, because the malicious device 106 is present at the ATM 104a, the test signals 134 may include attributes of the malicious device 106, including unexpected fluctuations in voltage signals of other components 108, unexpected EM radiation, unexpected operating frequency, unexpected serial number (if the malicious device 106 is connected to at least one of component 108 by wires or wirelessly).

In response to detecting and obtaining the test signals 134, the card device 120a may feed the test signals 134 to the FFT module 152 and the deep learning algorithm 154. The FFT module 152 may extract different frequency components of the internal components 108 of the ATM 104a and malicious device 106 as shown in the frequency spectrum plot 222. The frequency domain plot 222 has y-axis as frequency signal power in dB and y-axis as frequency KHz. As shown in the plot 222, the frequency component of the malicious device 106 differs from other frequencies of component 108. The output of the FFT module 152, for example, the frequency components of the internal components 108 of the ATM 104a and frequency component of malicious device 106 may be fed to the deep learning algorithm 154.

The card device 120a (e.g., via the deep learning algorithm 154) extracts a set of test features 212 from the test signals 134 and the input received from the FFT module 152. The test features 212 may indicate the test profile of the ATM 104a. In this process, the deep learning algorithm 154 via a neural network may determine the test features 212. The test features 212 may be represented by the test feature vector 210 which comprises numerical values. The test features 212 may include the observed electromagnetic signal radiation patterns of the internal components 108 of the ATM 104a and malicious device 106, I/O voltage signals, electrical signals, serial numbers, component properties associated with the internal components 108 of the ATM 104a and the malicious device 106.

Determining Whether a Malicious Device is Installed at the ATM

The card device 120a may compare the test feature vector 210 with the baseline feature vector 214. In this process, in some embodiments, the card device 120a may compare each test feature 212 with a counterpart baseline feature 216. For example, the card device 120a may compare the test EM signals with baseline EM signals, test I/O voltage signals with baseline I/O voltage signals, test serial numbers with baseline serial numbers, test component property data with baseline component property data, and the like. The card device 120a may determine a deviation or difference between the test features 212 and the baseline features 216. If it is determined that the deviation or difference between the test features 212 and baseline features 216 is more than a threshold percentage (e.g., more than 20%, 30%, etc.), the card device 120a may determine that an unverified or malicious device 106 has been added or installed at the ATM 104a causing the deviation or difference between the test features 212 and the baseline features 216.

In some embodiments, in comparing the test feature vector 210 with baseline feature vector 214, the card device 120a may determine the Euclidean distance between the test feature vector 210 and baseline feature vector 214. If the determined Euclidean distance is more than a threshold distance (e.g., more than 0.1 centimeters (cm), 0.2 cm, etc.), the card device 120a may determine that the deviation or difference between the test features 212 and the baseline features 216 is more than the threshold percentage 156. In some embodiments, the Euclidean distance between the test feature vector 210 and baseline feature vector 214 may be inversely proportional to a similarity score between them. Therefore, as the Euclidean distance between the test feature vector 210 and baseline feature vector 214 decreases, it may be an indication that the similarity between test feature vector 210 and baseline feature vector 214 increases. In some embodiments, other types of vector similarity measurement techniques may be used to compare the test feature vector 210 and baseline feature vector 214. In some embodiments, determining that the deviation between the test features 212 and the baseline features 216 is more than a threshold percentage (e.g., 20%, 30%, etc.) comprises determining that more than a threshold percentage of the test features 216 is not within a threshold range (e.g., within 1%, 2%, etc.) from corresponding baseline features 216.

Performing Countermeasure Actions

In response to determining that the malicious device 106 is installed at the ATM 104a, the card device 120a may perform one or more countermeasure actions 180. For example, the card device 120a may disable the data communications with the ATM 104a. In this example, the ATM 104a (including the malicious device 106) may not be able to interact with the card device 120a, similar to that described in FIG. 1. In another example, the card device 120a may switch on the red LED indicator 128 of the card device 120a. In this example, the card device 120a may activate the first mode of the LED indicator (e.g., visual indicator), where in the first mode, the LED indicator emits a red light. This operation informs the user 102 that the ATM 104a is not safe to use and a malicious device 106 is installed at the ATM 104a.

In another example, the card device 120a may transmit the alert signal 150 to the server 160. The alert signal 150 may include the location coordinate of the card device 120a which corresponds to the location coordinate of the ATM 104a when the card device 120a is at the ATM 104a. The alert signal 150 may optionally include the test signal 134. In some embodiments, the server 160 and/or an operator may process and evaluate the test signals 134 and confirm or override the determination of the card device 120a with regards to the presence of the malicious device 106 at the ATM 104a, and provide the confirmation or override message to the card device 120a. In response to receiving the alert signal 150, the server 160 may transmit the deactivation signal 176 to the ATM 104a causing the ATM 104a to shut down.

In some embodiments, in response to receiving the alert signal 150, the server 160 may forward the alert signal 150 to one or more card devices 120 that are within the threshold distance 224 from the ATM 104a. For example, the server 160 may search the database 140 and identify card devices 120 whose location coordinates 144 are within the threshold distance 224 from the ATM 104a. The server 160 may identify the card devices 120 that may or may not be paired with the card device 120a. In response, the server 160 may forward the alert signal 150 to those card devices 120. In some embodiments, in response to receiving the alert signal 150, the card device 120 may cause the LED indicator 128 to emit a red light, similar to that described above. In some embodiments, the card device 120 may disable data communications of the card device 120, e.g., with the ATM 104a, similar to that described above.

In another example, the card device 120a may transmit the alert signal 150 to the card devices 120b-c that are paired with or associated with the card device 120a as indicated in group 142 as described in FIG. 1 and are within the threshold distance 224 from the ATM 104a. For example, the card device 120a may access the group 142 stored in the database 140 (see FIG. 1) and fetch the location coordinates 144b-c of the card devices 120b-c, respectively. The card device 120a may determine whether any of the card devices 120b-c is located within the threshold distance 224 from the ATM 104a based on comparing the location coordinate 172a of the ATM 104a with each of the location coordinates 144b-c of the card devices 120b-c.

If the card device 120a determines that a card device 120b-c is within the threshold distance 224 from the ATM 104s, the card device 120a may transmit the alert signal 150 to the card device 120b-c. In some embodiments, in response to receiving the alert signal 150, the card device 120b-c may cause the LED indicator 128 to emit a red light, similar to that described above. In some embodiments, the card device 120b-c may disable data communications of the card device 120b-c, e.g., with the ATM 104a, similar to that described above. In some embodiments, the card device 120a and/or server 160 may update the baseline features 216 based on changes made to the components 108 in an updating process by authorized personnel.

Method for Detecting Anomalous ATMs

FIG. 3 illustrates an example flowchart of a method 300 for detecting anomalous ATMs 104 according to some embodiments of the present disclosure. Modifications, additions, or omissions may be made to method 300. Method 300 may include more, fewer, or other operations. For example, operations may be performed in parallel or in any suitable order. While at times discussed as the system 100, card devices 120, ATMs 104, server 160, or components of any of thereof performing operations, any suitable system or components of the system may perform one or more operations of the method 300. For example, one or more operations of method 300 may be implemented, at least in part, in the form of software instructions 208, 132, 168 of FIG. 1, stored on tangible non-transitory computer-readable medium (e.g., memory 206, 130, 166 of FIG. 1) that when run by one or more processors (e.g., processor 202, 122, 162 of FIG. 1) may cause the one or more processors to perform operations 302-316.

At operation 302, the card device 120a obtains a set of test signals 134 that comprises electromagnetic signals propagated from the internal components 108 of the ATM 104a and malicious device 106 (if present), similar to that described in FIGS. 1 and 2. The test signals 134 may include other information as described in FIGS. 1 and 2.

At operation 304, the card device 120a extracts a set of test features 212 from the test signal 134. For example, the card device 120a may feed the test signals 134 to the FFT module 152 and deep learning algorithm 154 to extract the test features 212, similar to that described in FIGS. 1 and 2.

At operation 306, the card device 120a obtains a set of baseline signals 174a that comprises expected electromagnetic signals associated with the internal components 108 of the ATM 104a, similar to that described in FIGS. 1 and 2. The baseline signals 174a may include other information as described in FIGS. 1 and 2.

At operation 308, the card device 120a extracts a set of baseline features 216 from the baseline signal 174a. For example, the card device 120a may feed the baseline signal 174a to the FFT module 152 and deep learning algorithm 154 to extract the baseline features 216, similar to that described in FIGS. 1 and 2. At operation 310, the card device 120a compares each test feature 212 with the counterpart baseline feature 216, similar to that described in FIGS. 1 and 2.

At operation 312, the card device 120a determines whether the difference between the test features 212 and baseline features 216 is more than a threshold percentage 156. For example, the card device 120a may determine whether the Euclidean distance between the test feature vector 210 and the baseline feature vector 214 is more than a threshold distance, similar to that described in FIGS. 1 and 2. If it is determined that the difference between the test features 212 and baseline features 216 is more than a threshold percentage 156, the method 300 may proceed to operation 314. Otherwise, the method 300 may return to operation 302 to continue monitoring subsequent and incoming test signals 134.

At operation 314, the card device 120a determines that a malicious device 106 is installed at the ATM 104a. At operation 316, the card device 120a performs one or more countermeasure actions 180, similar to that described in FIGS. 1 and 2.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus for detecting anomalous automated teller machines (ATMs), comprising:
a memory configured to store a set of baseline signals associated with an ATM, wherein the set of baseline signals comprises electromagnetic signals propagated from internal components of the ATM when the ATM is initiated to operate; and
a processor operably coupled with the memory, and configured to:
obtain a set of test signals that comprises electromagnetic signals propagated from the internal components of the ATM;
extract a set of test features from the set of test signals, wherein the set of test features indicates a test profile of the ATM;
extract a set of baseline features from the set of baseline signals, wherein the set of baseline features comprises expected electromagnetic radiation patterns associated with the internal components of the ATM;
compare each of the set of test features with a counterpart baseline feature from among the set of baseline features;
determine a deviation between the set of test features and the set of baseline features;
determine that the deviation between the set of test features and the set of baseline features is more than a threshold percentage; and
in response to determining that the deviation between the set of test features and the set of baseline features is more than the threshold percentage:
determine that an unverified device is installed at the ATM causing the deviation between the set of test features and the set of baseline features; and
disable data communications between the apparatus and the ATM.

2. The apparatus of claim 1, wherein:
the apparatus further comprises a visual indicator comprising an light emitting diode (LED) indicator;
the processor is further configured to activate a first mode of the visual indicator in response to determining that the unverified device is installed at the ATM; and
in the first mode, the visual indicator emits a red light.

3. The apparatus of claim 1, wherein:
the apparatus further comprises a location sensor configured to determine a location coordinate of the apparatus;
the processor is further configured to transmit, to a server, a message that comprises the location coordinate of the apparatus in response to determining that the unverified device is installed at the ATM; and
the location coordinate of the apparatus corresponds to the location coordinate of the ATM when the apparatus is at the ATM.

4. The apparatus of claim 3, wherein the apparatus comprises a card device.

5. The apparatus of claim 1, wherein the processor is further configured to communicate an alert signal to one or more card devices that are within a threshold vicinity of the ATM, wherein the alert signal indicates that the ATM is anomalous.

6. The apparatus of claim 1, wherein the processor is further configured to update the set of baseline features based at least in part upon one or more changes made to the internal components of the ATM in an updating process by authorized personnel.

7. The apparatus of claim 1, wherein determining that the deviation between the set of test features and the set of baseline features is more than a threshold percentage comprises determine that more than a threshold percentage of the set of test features is not within a threshold range from corresponding baseline features from the set of baseline features.

8. A method for detecting anomalous automated teller machines (ATMs), comprising:
obtaining a set of test signals that comprises electromagnetic signals propagated from internal components of an ATM;
extracting a set of test features from the set of test signals, wherein the set of test features indicates a test profile of the ATM;
extracting a set of baseline features from a set of baseline signals, wherein:
the set of baseline signals comprises electromagnetic signals propagated from the internal components of the ATM when the ATM is initiated to operate; and
the set of baseline features comprises expected electromagnetic radiation patterns associated with the internal components of the ATM;
comparing each of the set of test features with a counterpart baseline feature from among the set of baseline features;
determining a deviation between the set of test features and the set of baseline features;
determining that the deviation between the set of test features and the set of baseline features is more than a threshold percentage; and
in response to determining that the deviation between the set of test features and the set of baseline features is more than the threshold percentage:
determining that an unverified device is installed at the ATM causing the deviation between the set of test features and the set of baseline features; and
disabling data communications between an apparatus and the ATM.

9. The method of claim 8, further comprising activating a first mode of a visual indicator associated with the apparatus in response to determining that the unverified device is installed at the ATM, wherein in the first mode, the visual indicator emits a red light.

10. The method of claim 8, further comprising:
determining a location coordinate of the apparatus; and
transmitting, to a server, a message that comprises the location coordinate of the apparatus in response to determining that the unverified device is installed at the ATM, the location coordinate of the apparatus corresponds to the location coordinate of the ATM when the apparatus is at the ATM.

11. The method of claim 8, further comprising communicating an alert signal to one or more card devices that are within a threshold vicinity of the ATM, wherein the alert signal indicates that the ATM is anomalous.

12. The method of claim 8, further comprising updating the set of baseline features based at least in part upon one or more changes made to the internal components of the ATM in an updating process by authorized personnel.

13. The method of claim 8, wherein determining that the deviation between the set of test features and the set of baseline features is more than a threshold percentage comprises determining that more than a threshold percentage of the set of test features is not within a threshold range from corresponding baseline features from the set of baseline features.

14. The method of claim 8, wherein the apparatus comprises a card device.

15. A non-transitory computer-readable medium storing instructions that, when executed by a processor, cause the processor to:
obtain a set of test signals that comprises electromagnetic signals propagated from internal components of an ATM;
extract a set of test features from the set of test signals, wherein the set of test features indicates a test profile of the ATM;
extract a set of baseline features from a set of baseline signals, wherein:
the set of baseline signals comprises electromagnetic signals propagated from the internal components of the ATM when the ATM is initiated to operate; and
the set of baseline features comprises expected electromagnetic radiation patterns associated with the internal components of the ATM;
compare each of the set of test features with a counterpart baseline feature from among the set of baseline features;
determine a deviation between the set of test features and the set of baseline features;
determine that the deviation between the set of test features and the set of baseline features is more than a threshold percentage; and
in response to determining that the deviation between the set of test features and the set of baseline features is more than the threshold percentage:
determine that an unverified device is installed at the ATM causing the deviation between the set of test features and the set of baseline features; and
disable data communications between an apparatus and the ATM.

16. The non-transitory computer-readable medium of claim 15, the instructions further cause the processor to activate a first mode of a visual indicator associated with the apparatus in response to determining that the unverified device is installed at the ATM, wherein in the first mode, the visual indicator emits a red light.

17. The non-transitory computer-readable medium of claim 15, the instructions further cause the processor to:
determine a location coordinate of the apparatus; and
transmit, to a server, a message that comprises the location coordinate of the apparatus in response to determining that the unverified device is installed at the ATM, wherein the location coordinate of the apparatus corresponds to the location coordinate of the ATM when the apparatus is at the ATM.

18. The non-transitory computer-readable medium of claim 15, the instructions further cause the processor to communicate an alert signal to one or more card devices that are within a threshold vicinity of the ATM, wherein the alert signal indicates that the ATM is anomalous.

19. The non-transitory computer-readable medium of claim 15, the instructions further cause the processor to update the set of baseline features based at least in part upon one or more changes made to the internal components of the ATM in an updating process by authorized personnel.

20. The non-transitory computer-readable medium of claim 15, wherein determining that the deviation between the set of test features and the set of baseline features is more than a threshold percentage comprises determining that more than a threshold percentage of the set of test features are not within a threshold range from corresponding baseline features from the set of baseline features.

* * * * *